United States Patent [15] 3,676,603
Budrys et al. [45] July 11, 1972

[54] CODE CALL CIRCUIT FOR PAGING IN A PBX

[72] Inventors: Ignas Budrys; Ernest O. Lee, Jr., both of Fairport, N.Y.

[73] Assignee: Stromberg-Carlson Corporation, Rochester, N.Y.

[22] Filed: July 23, 1970

[21] Appl. No.: 57,735

[52] U.S. Cl. ....179/18 BF
[51] Int. Cl. ....H04m 3/42
[58] Field of Search ....179/18 BF

[56] References Cited

UNITED STATES PATENTS

| | | | |
|---|---|---|---|
| 2,727,947 | 12/1955 | Nilsson | 179/18 BF |
| 2,966,554 | 12/1960 | Dubois | 179/18 BF |

*Primary Examiner*—Kathleen H. Claffy
*Assistant Examiner*—Thomas W. Brown
*Attorney*—Craig, Antonelli & Hill

[57] ABSTRACT

Code call circuit for use with a common control telephone system, particularly a PBX, wherein means is provided to mark the calling line circuit and totally release the code call circuit upon detection of an answer code from the subscriber being paged, so that the common control can connect the subscribers in the normal manner through a junctor circuit.

18 Claims, 6 Drawing Figures

INVENTORS
IGNAS BUDRYS
ERNEST O. LEE, JR.

BY Craig, Antonelli, Stewart & Hill

ATTORNEYS

CODE CALL CIRCUIT FOR PAGING IN A PBX

The present invention relates to a code call or paging system for automatic telephone exchange, and particularly for a private branch automatic telephone exchange.

The object of a code call system is to make possible the establishment of a communication connection with a certain person in a business or similar large office establishment even through that person is temporarily absent from his desk or other normal location and therefore cannot hear his telephone ring. Thus, he is not aware that he is being called and therefore cannot be contacted, even though he may still be within the building served by the private branch exchange.

In a typical code call system, the calling party dials a first digit which gains access to a code call trunk and then dials a pair of digits which identify the party which is being called. The two identifying digits are used to generate code signals which may actuate audible or visual indicating means, such as a bell, gong, buzzer, flashing lights, or the like. Upon recognizing this signal, the wanted party answers the call by dialing a recognition digit at the nearest telephone thereby establishing connection with the code call circuit, which serves to interconnect the respective parties. The paging signal is then automatically stopped.

One disadvantage of the known code call circuits relates to the fact that communication connection between respective parties is ultimately established through the code call circuit or a portion thereof, thereby tying up this special equipment during the duration of the call. Attempts have been made to solve this problem by a complicated storage of dialed information from respective parties attempting to establish code calls; however, the complexity of the additional equipment required to handle the multiple calls oftentimes results in a higher cost for provision of equipment than would be encountered if additional code call circuits were provided.

Accordingly, it is an object of the present invention to provide a telephone system including a code call circuit which may be completely released after a communication connection is established between the respective parties.

It is another object of the present invention to provide a telephone system including a code call circuit wherein the communication connection between parties of a code call is established through a standard junctor circuit rather than through the code call circuit or any portion thereof.

It is a further object of the present invention to provide a telephone system including a code call circuit wherein the code call circuit is automatically released in its entirety as soon as a communication connection is established between respective parties of a code call.

It is still another object of the present invention to provide a PABX telephone system including a code call feature wherein the attendant may place the code call circuit on hold during the paging of the called subscriber and automatically receives a recall as soon as the called subscriber has answered.

It is still a further object of the present invention to provide a telephone system having a code call feature which is more efficient in operation and less complicated in construction due to the ability to establish subsequent code calls while the communication connection associated with an initial code call is still established.

In accordance with one feature of the present invention, as soon as the called subscriber replies to the paging signal by dialing a special digit indicative of reply to a code call, the code call circuit will mark the line circuit of the calling party so that the location of both the calling and the called stations is established by the common control in the telephone system permitting interconnection of the subscribers in the normal way through a junctor circuit, rather than through the code call circuit. In this way, the establishment of a connection between the calling and called parties of the code call permits the release of the code call circuit immediately rendering it available for use in connection with another calling subscriber wishing to establish a code call. The result is a great increase in the efficiency of the equipment and the ability to handle a plurality of code calls with a single code call circuit without encountering annoying delays in obtaining service from the telephone system in connection with establishment of the code call.

In accordance with another feature of the present invention, the code call circuit of the present invention provides means for effecting automatic recall to the attendant in a PBX when the code call initiated by the attendant is placed on hold. Thus, once the attendant has dialed the three digits necessary to establish the code call, the hold key at the attendant's console may be depressed to place the code call circuit on hold thereby freeing the attendant to perform other duties while the code call is in process. The called party will be signaled by the audible or visual indicating means provided, and as soon as he dials the required answer code digit, the calling code circuit will automatically recall the attendant to indicate that the called party has been reached and is available.

An additional feature of the present invention resides in the manner in which code call generation is initiated. The paging of the called subscriber is controlled by the last two digits of the three-digit number dialed by the calling subscriber. These last two digits will generate a sequence of relay closures, the relay being connected to drive the indicating means, such as a bell or gong, or a visual display unit, such as a plurality of indicating lights. The relay closures are effected by pulses from a pulse source which is allowed to run until the number of pulses generated equals a count corresponding to the second or third digit dialled by the subscriber. In order to ensure that counting starts at the beginning of a pulse signal from the pulse source, thereby ensuring that the first count is not partially cut off, a special timing control is provided in conjunction with the output of the pulse source and the acquisition of the code call circuit.

These and other objects, features and advantages of the present invention will become more apparent from the following detailed description thereof, when taken in conjunction with the accompanying drawings, which illustrate one embodiment of the present invention, and wherein.

The principles of the present invention are described in detail below in association with an exemplary PBX telephone system of the common control type. Since the present invention is not restricted to use in association with this or any one other particular telephone system, it should be understood that the specific telephone system described herein is presented only for purposes of facilitating an understanding of the basic principles of the invention. Accordingly, only those detailed features of the disclosed common control telephone system which are important to the operation of the present invention have been described in detail.

GENERAL SYSTEM DESCRIPTION

Figure 1:
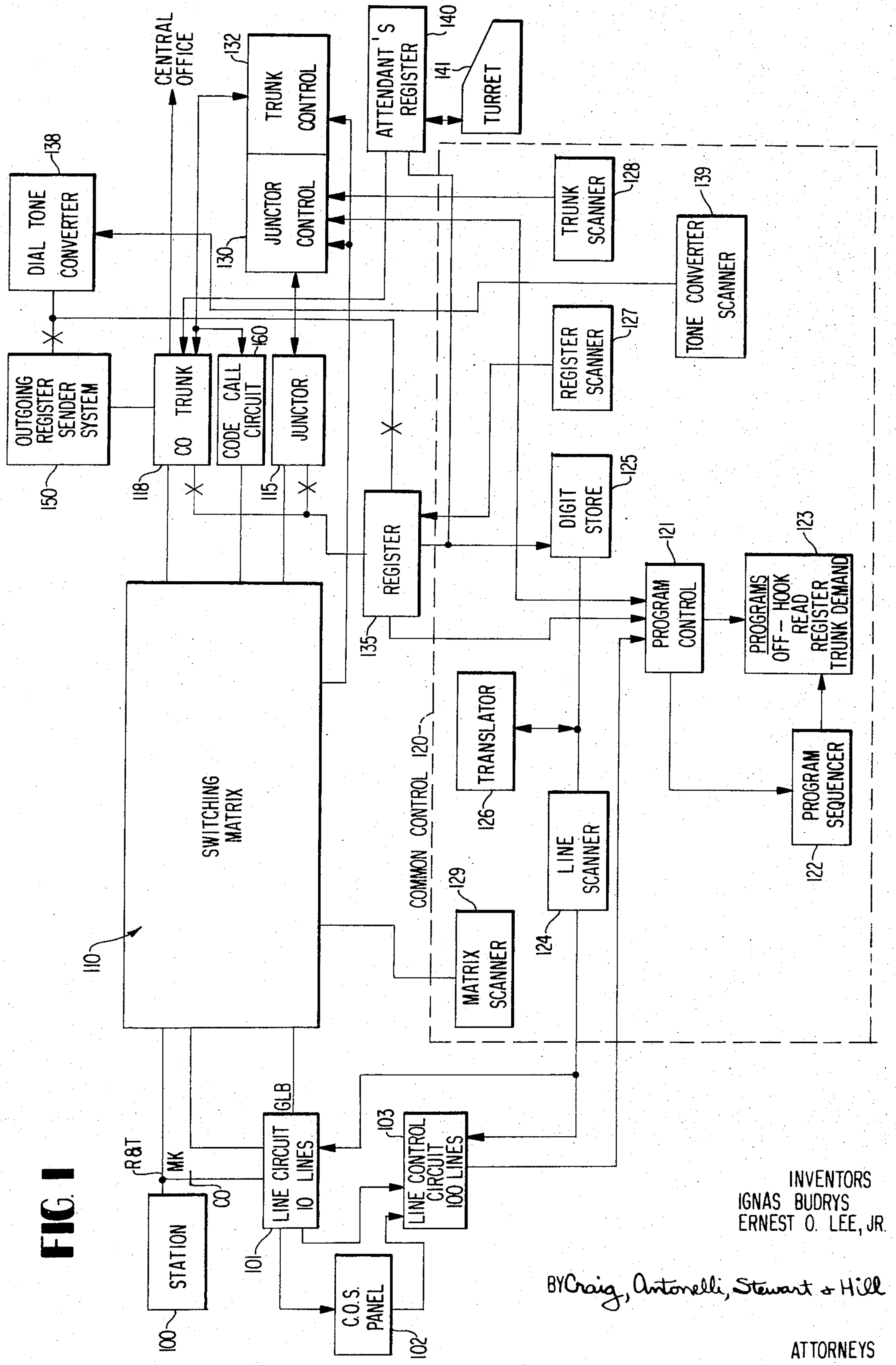
FIG. 1 is a schematic block diagram of a PABX common control telephone system including the code call circuit of the present invention.

FIG. 1 illustrates an overall block diagram of a common control PBX system capable of connecting one station to another station or to the central office via a trunk circuit under control of the common control circuits. The system provides a plurality of stations 100 (of which only a single station is illustrated in FIG. 1 for purposes of simplicity) with each group of ten stations 100 being serviced by a line circuit 101 associated with a particular input of the switching matrix 110. The switching matrix 110 is a typical matrix network formed of three stages of reed relay switches providing a plurality of paths between a given input connected to one of the plurality of stations 100 and a given output connectable to a junctor 115 or central office trunk 118. All of the switching functions of the system are controlled by the common control circuits 120 which perform the functions for an offhook program, a read register program and a trunk demand program. One or more junctor controls 130 and trunk controls 132 along with a plurality of registers 135 are also provided for purposes of effecting connection of a particular station requiring service to the common control equipment so that the operations necessary to the establishment of a communication connection within the PBX or outside thereof to the central office may be performed. A class of service panel 102 is provided for each group of 100 lines and indicates for the respective stations served by the line circuit special classes of service which are available for the stations and particular equipment which may be available or used thereby, such as tone-dial equipment as opposed to rotary dial.

The common control 120 is divided into several separate functional circuits which serve to control the program of operations carried out to perform the switching processes including the path checking and selection required for connection of a station requesting service to a register or central office trunk. A line control circuit 103 accommodating ten line circuits 101 serves as an interface between the common control 120 and the individual line circuits 101. The common control 120 typically includes a program control 121 which selects the program to be run to satisfy the request for service and a program sequencer 122 and program circuit 123, which implement the program selected by the program control 121. The program control 121, program sequencer 122 and program circuit 123 may typically take the form of a wired logic or other programmed system of the type well known in the art. The various control signals eminating from this program control area of the common control 120 have not been illustrated in detail since the arrangement and functioning of such elements do not directly relate to the present invention and such systems are conventionally provided in several forms in the known prior art.

The common control 120 also includes a line scanner 124 which determines the line demanding service on an originating call and identifys and acts as a line marker when terminating a call. A digit store 125 and a translator 126 are also provided as part of the common control 120 and serve the functions normally associated with such elements. A register scanner 127 examines the status of the registers and register senders to determine if an idle register or outgoing register sender is available for use in connection with a calling station or to find the register demanding service to complete a call. A trunk scanner 128 and matrix scanner 129 are associated with the path selecting and checking operation performed in connection with the switching matrix 110, the trunk scanner 128 serving to scan the junctors 115 and central office trunks 118 through the junctor control 130 or trunk control 132 to determine those which may be available to a calling station through the switching station 110. The matrix scanner 129 serves to scan the links in the switching matrix 110 in the process of establishing a path from a given calling station through the switching matrix, in accordance with a system disclosed in copending application, Serial No. 37,772, filed May 15, 1970, in the name of Ernest O. Lee, Jr., and assigned to the same assignee as the present application. This copending application also includes a detailed description and illustration of the switching matrix 110 and the various elements including the junctor control 130 and trunk control 132 along with other elements required for the path finding operation.

In order to provide attendant service in the system, an attendant's register 140 and turret 141 are connected to the central office trunks 118 and registers 135 to provide service for incoming and outgoing calls. Also associated with the central office trunks 118 is an outgoing register sender system 150, as provided in accordance with the present invention.

Typical operation of the system of FIG. 1 is initiated by a subscriber at a given station 100 lifting the hand set of his telephone, which results in the closing of a direct current loop to the tip T and ring R leads of the line thereby signaling the associated line circuit 101 of the demand for service. The demand is placed through the associated line control circuit 103 to the common control 120 for an offhook program, and the common control causes the line scanner 124 to scan over the lines to identify the particular line requesting service. Upon identifying the line requesting service, a class of service check is made through the COS panel 102 to determine if the line has a rotary dial class of service or a multifrequency class of service, information which is necessary to determine whether a tone dial converter 138 is necessary or not in the establishment of the call.

The common control 120 causes the line circuit 101 to place a negative potential mark on its mark lead, which is connected to an input of the switching matrix 110. The common control 120 then actuates the matrix scanner 129 initiating the path checking and selecting operation which will select a single path through the switching matrix 110 from the station 100 requesting service. The common control also causes the trunk scanner to scan over the junctors, through the junctor control, for an idle junctor, and the register scanner to select an idle register. The cross points of the selected matrix path are operated at this time connecting the calling line through the junctor to the selected register. Dial tone is returned to the calling line from the register through the switching matrix, and at this time, the common control releases and is available to handle other requests for service.

After receiving dial tone, the subscriber dials one or more digits which are received and stored in the register. The common control analyzes the dialed digits as they are received to determine whether the call to be established is a local call, an outgoing trunk call or a special request for service. In the case of a code call, the first digit dialed by the calling subscriber will be a special digit indicating that the call is to be a code call and requesting connection of the code call trunk. After the second and third digits are received, the register will place a request for service to the common control. The common control starts the register scanner scanning for the register requesting service, and when the register connected to the particular station from which the code call digits have been received is found, the three stored digits indicating the code call and the identity of the called subscriber are passed from the register to the digit store of the common control. The common control will at this time cause the line scanner to identify the calling line and a class of service check is made to determine if the calling line has a class of service which allows the establishment of a code call. If the calling subscriber is permitted to establish a code call, the common control will effect connection of the code call circuit 160 to an outlet of the switching matrix 110 and a path will then be established between the code call circuit 160 and the calling station through the switching matrix. The second and third dialed digits will then be transferred to the code call circuit 160 and the code call will be set up in a manner to be described in more detail hereinafter.

CODE CALL CIRCUIT

Figure 2:
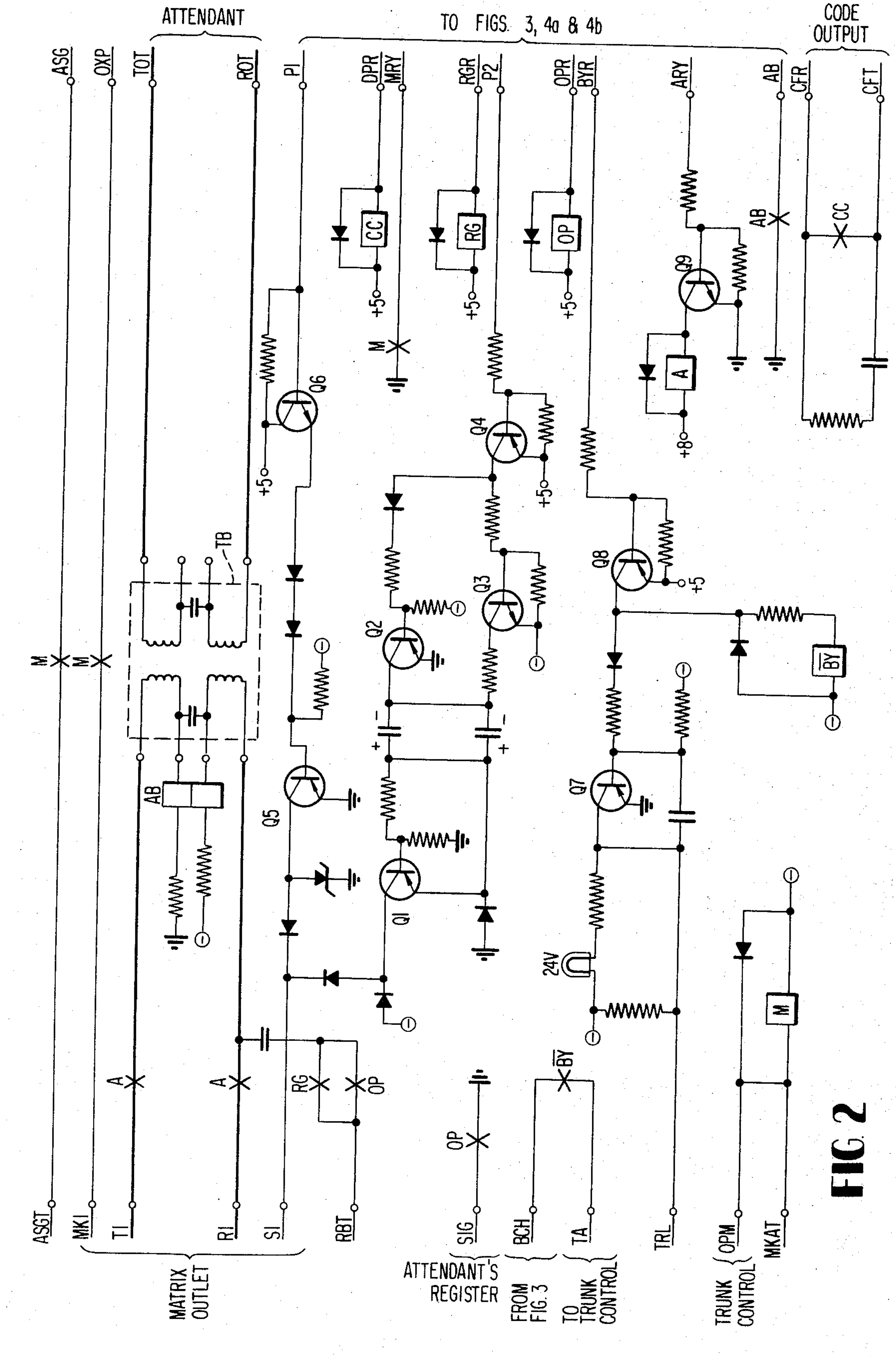
FIG. 2 is a schematic circuit diagram of the transmission portion of the code call circuit.

The operating portion of the code call circuit 160 is illustrated in FIG. 2, and includes a transmission bridge TB from which extend lines T1 and R1 to an outlet of the switching matrix 110 along with a sleeve lead S1 and a mark lead MK1. The transmission bridge TB may also be extended in the other direction via lines TOT and ROT to the attendant's register 140.

The code call circuit 160 includes a plurality of relays which perform the various functions necessary to the establishment of a code call. Acquisition of the code call circuit 160 is effected by operation of a relay M which connects ground on the mark leads MK1 as an initial step in the process by which the code call circuit 160 is connected to the subscriber through the switching matrix 110. A relay BY marks the code call circuit 160 busy to the trunk control 132. A relay RG connects ring back to the calling subscriber on a subscriber initiated code call. The relay AB connected to the transmission bridge TB monitors the DC loop condition to the subscriber indicating the on or off hook condition of the subscriber. The relay A connects the T1 and R1 lines from the code call circuit 160 through the switching matrix 110 to the subscriber. The relay OP provides ring back to the called subscriber on an attendant initiated call and signals the attendant if the attendant has placed the code call circuit 160 on a hold condition. The relay CC is operated by the code generated signals to close the circuit to the code indicator circuit, such as a gong, array of flashing lights, etc.

Figure 3:
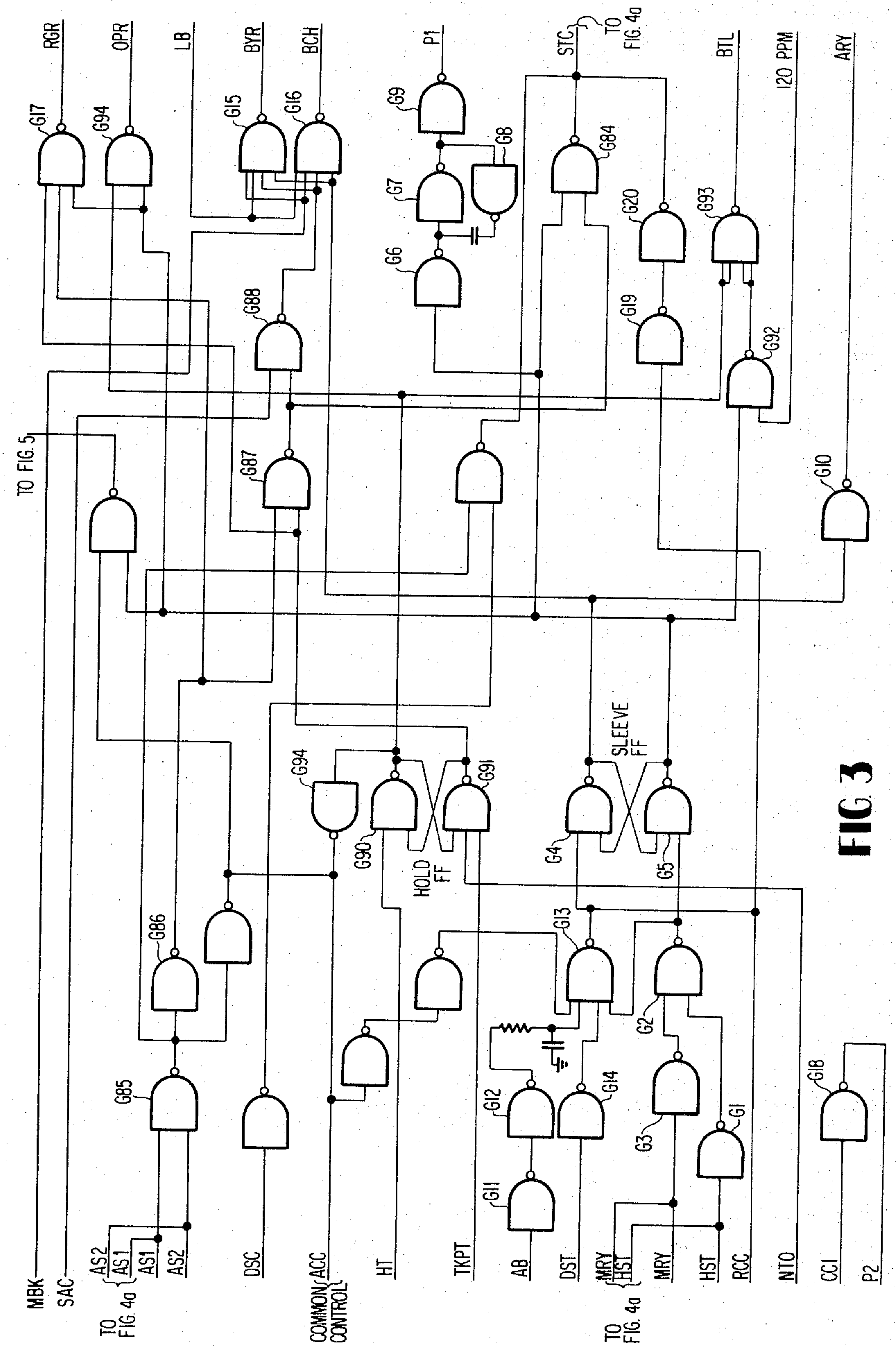
FIG. 3, FIGS. 4*a* and 4*b*, in combination, and FIG. 5 are schematic circuit diagrams of the logic control circuitry of the code call circuit.
Figure 4A:
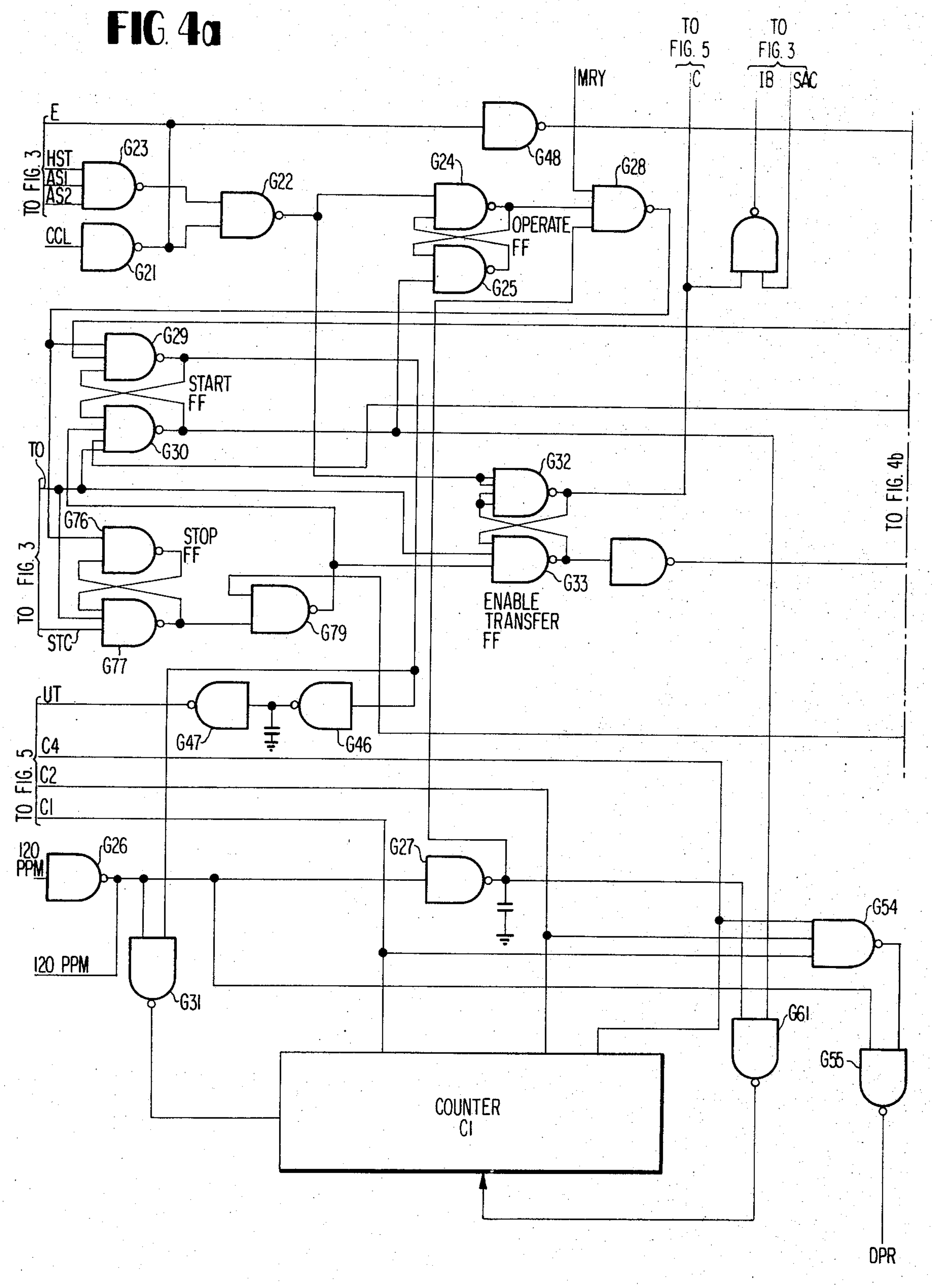
Figure 4B:
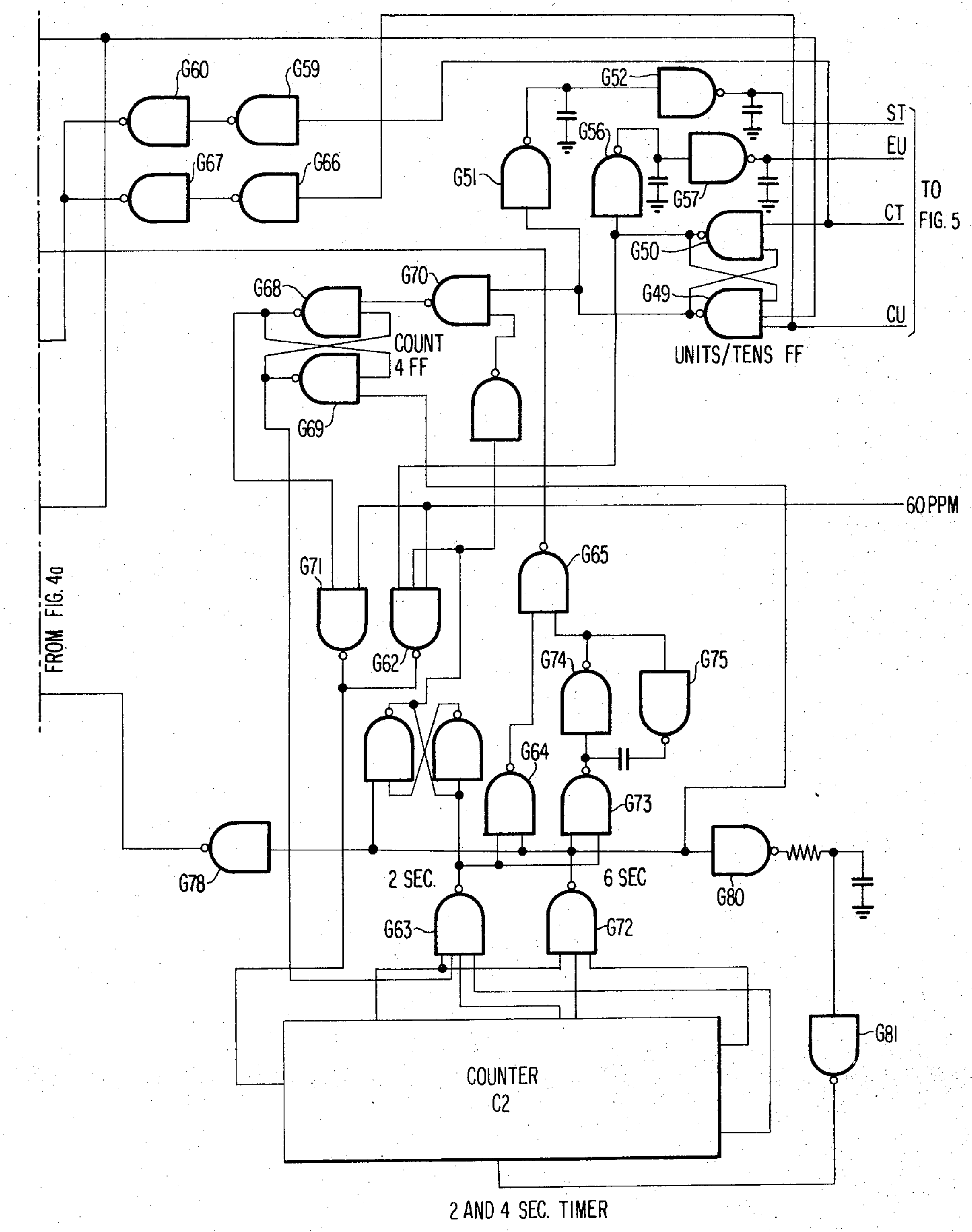
Figure 5:
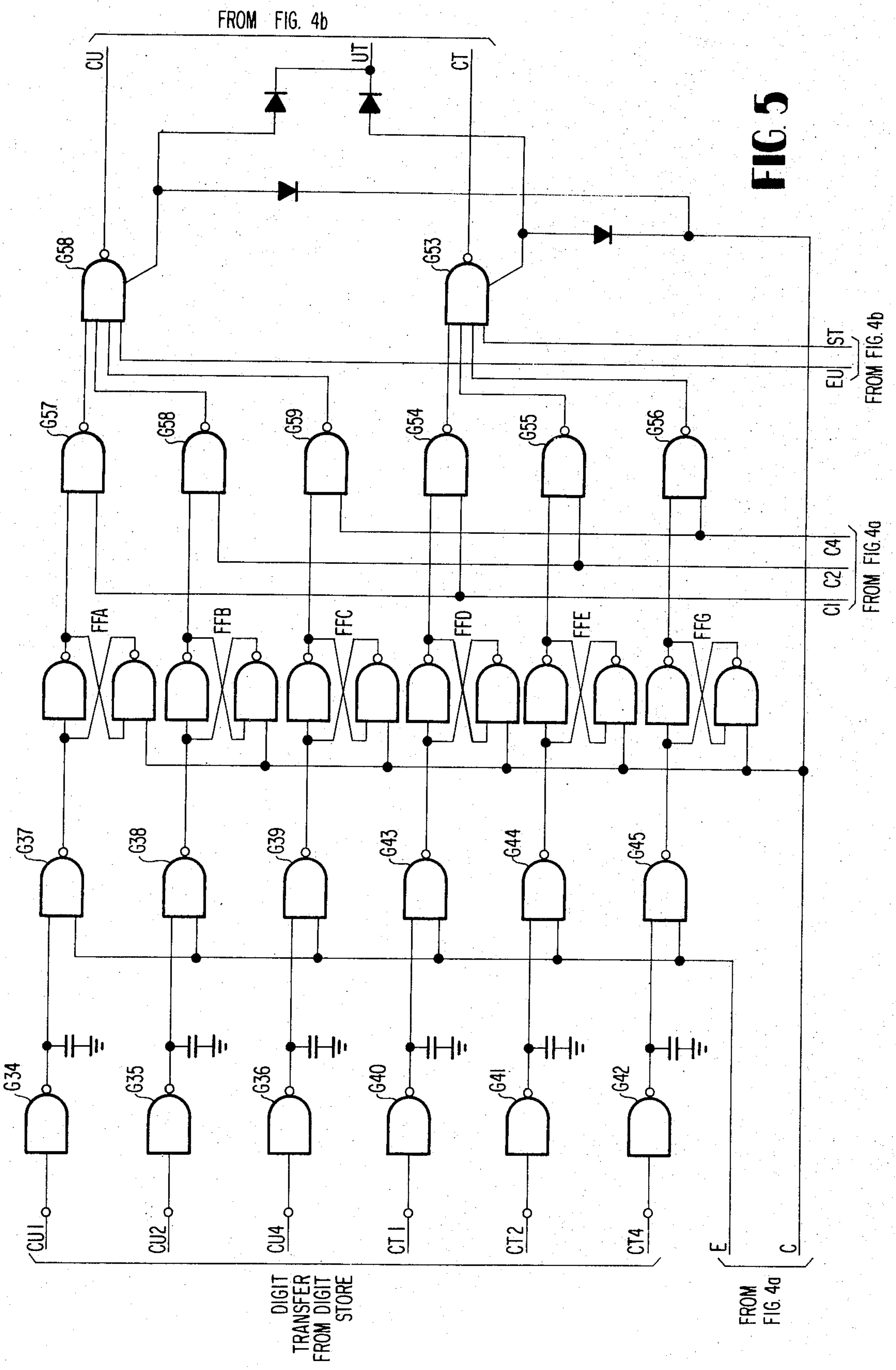

The logic control circuitry for operating the various relays in the code call circuit 160 is illustrated in FIGS. 3, 4 and 5, a description of which will be provided in conjunction with a description of the various ways in which a code call is established in accordance with the present invention.

SUBSCRIBER ORIGINATED CODE CALL

When an authorized subscriber dials a YXX number, the common control recognizes the Y digit as a request for establishment of a code call and the program control circuits 121, 122 and 123 (FIG. 1) proceed to set up the call. The trunk control 132 is actuated by the common control to acquire the code call circuit 160. This is accomplished by the extension of a ground from the trunk control 132 to the line OPM in the code call circuit 160 operating the M relay. At the same time, ground is placed on line OXP from the common control, which extends through the closed contacts of the M relay to the mark lead MK1 to the switching matrix 110. A free path through the switching matrix 110 is then sought out by the common control in accordance with the procedures described in the aforementioned copending application of Ernest O. Lee, Jr. At the same time, a ground is applied to lead HST (FIG. 3) from program control which is applied through gate G1 to one input of AND gate G2. At the same time, ground is applied through the closed contacts of the M relay on lead MRY (FIG. 2) through gate G3 (FIG. 3) to the other input of AND gate G2. A high (+5) at both inputs of AND gate G2 will set the sleeve flip-flop made up of gates G4 and G5. The setting of the sleeve flip-flop produces a high at the output of gate G5 thereof which produces ground via gates G6-G9 to output lead P1, which extends to the circuit comprised of transistors Q5 and Q6 (FIG. 2) which places ground on the sleeve lead S1 to hold the matrix path selected in the path finding operation. The operation of the sleeve flip-flop also provides ground at the output of gate G4 thereof which applied to gate G10 produces a high (+5) on output lead ARY to transistor Q9 (FIG. 2) thereby operating the A relay. Operation of the A relay connects the leads T1 and R1 from the transmission bridge TB in the code call circuit 160 to the matrix outlet of the switching matrix 110 thereby connecting the code call circuit 160 to the calling subscriber.

The DC current in the closed loop to the subscriber will operate the AB relay which will extend ground through the closed contacts of the relay to output line AB (FIG. 2) which extends through gates G11 and G12 (FIG. 3) to one input of AND gate G13, which is disabled so long as the AB relay is actuated. Ground signals are periodically applied to the input lead DST from the trunk control via gate G14 to another input of the gate G13. When the relay AB is deactuated by the subscriber going onhook, the disabling signal at the output of gate G12 is no longer present and the ground pulses will actuate the gate G13 resetting the sleeve flip-flop.

At the time the sleeve flip-flop is set, the ground at the output of gate G4 thereof will be applied via gates G15 and G16 providing a high (+5) at output leads BYR and BCH. The lead BYR extends to transistor Q8 (FIG. 2) through which the relay BY is operated. The closed contacts of the BY connect line BCH to outgoing line TA (FIG. 2) to the trunk control indicating that the code call circuit 160 is busy. The high at the output of gate G5 of the sleeve flip-flop also provides ground at the output RGR of gate G17 which is applied to operate the RG relay in FIG. 2. The closed contacts of the RG relay apply ring back tone from lead RBT from the supervisory circuit to lead R1 to the calling subscriber. At this time, an indicating signal is being generated to page the called subscriber in a manner to be described hereinafter.

When the called party answers, for example by dialing an answer digit Z, the common control marks the station of the called party and places ground on input lead CC1 (FIG. 3) through gate G18 which places a high on lead P2 in FIG. 2. The high on lead P2 is applied to the circuit including transistors Q1 through Q4 which serves to place a +50V mark extends all the way through calling line to the common control. This +50V mark extends all the way through the switching matrix on the sleeve lead S1 where it is picked up by the line circuit 101. The common control identifies the line marked by the +50 pulse on the sleeve, and then places ground on input lead RCC in FIG. 3 effecting a resetting of the sleeve flip-flop thereby disconnecting the code call circuit 160 from the originating subscriber. When the lead RCC receives ground from the common control resetting the sleeve flip-flop, the common control then initiates a typical path finding operation to establish a connection through the switching matrix 110 between the marked calling line circuit and the marked called line circuit in the same manner as a standard call between subscribers. However, it should be noted that in accordance with the present invention the code call circuit 160 is entirely disconnected at this time so that the call is established through a junctor 115 rather than through any portion of the code call circuit 160. In this regard, it should be apparent that the resetting of the sleeve flip-flop will cause lead ARY to go to ground thereby releasing the A relay and disconnecting the transmission bridge TB from the switching matrix 110. The AB relay will also release at this time in view of the disconnection from the subscriber line circuit and P1 will go high as a result of the resetting of the sleeve flip-flop so that ground is no longer applied on the sleeve lead, thereby releasing the switch train through the switching matrix 110.

In addition to resetting the sleeve flip-flop, the ground from the common control on input lead RCC will also place ground on output lead STCC via gates G19 and G20 to stop the code generation. The code call is then completely under control of the common control with the code call circuit 160 having been completely disconnected so that it is available immediately for use in connection with another code call.

CODE CALL GENERATION

Code call generation will be described principally in connection with FIGS. 4 and 5. During the code call program, a ground will be applied to the CCL lead from the common control through gate G21 to one input of AND gate G22. At the same time, the ground applied to lead HST (FIG. 3) to set the sleeve flip-flop is also applied through gate G23 to the other input of AND gate G22 which serves to set the operate flip-flop made up of gates G24 and G25. Setting this flip-flop is necessary to ensure that the counter circuit is started at the correct time with respect to the 120 PPM signal applied at the input of gate G26, so that the first count is not partially cut off. As a result, the 120 PPM signal is applied through gate G26 and G27 to one input of AND gate G28, the other inputs of which are connected to the output of gate G24 of the operate flip-flop and lead MRY which receives ground from FIG. 2 upon operation of the M relay. Thus, counting is not started until the operate flip-flop has been set and the M relay is actuated. The output of AND gate G28 is applied as a set signal to the start flip-flop made up of gates G29 and G30. The output of gate G29 upon setting of the start flip-flop will enable gate G31 to pass the 120 PPM signal to the counter C1.

At the same time that the start flip-flop is set, the enable transfer flip-flop made up of gates G32 and G33 is set by the output from gate G22 which enables transfer of the second and third dialed digits for storage in the code call circuit 160. As will be remembered, the second and third digits XX designate the called party which is to be paged, these two digits being referred to hereinafter as the units digit and tens digit, respectively. As seen in FIG. 5, flip-flops FFA through FFC are provided to store the respective bits of the units digit and flip-flops FFD through FFG are provided to store the bits of the tens digit. The respective digits are received from the digit store in the common control, with the units digit being transferred through gates G34–G36 to input gates G37–G39. The bits of the tens digit are applied through gates G40–G42 to input gates G43–G45. The signal E which is generated from the output of gate G21 (FIG. 4) opens the input gates G37–G39 and G43–G45 so that the bits may be applied to the storage flip-flops.

Since the start flip-flop is set, the 120 PPM pulses start advancing the counter C1 via gates G26 and G31. At this time, the high at the output of gate G29 of the start flip-flop will be applied through gates G46 and G47 to lead UT in FIG. 5 and the output of gate G21 will be applied through gate G48 to set the units/tens flip-flop made up of gates G49 and G50. The output of this flip-flop applied through gates G51 and G52 provide a high at output line ST to gate G53 in FIG. 5. The counter C1 provides outputs C1, C2 and C4 which are applied respectively to gates G54 through G56 connected to the outputs of the storage flip-flops FFD–FFG, and the counter outputs are also applied respectively to the gates G57 through G59 connected to the outputs of the storage flip-flops FFA–FFC. Thus, the binary count from the counter C1 is anded in the gates G54–G56 with the binary value stored in the respective units and tens storage flip-flops. When the count reached by the counter C1 corresponds to the number stored in the storage flip-flops for the tens digit, gate G53 will be enabled providing an output on line CT. In the meantime, for each count of the counter C1, an output will be provided via gate G54 and gate G55 to line DPR in FIG. 2 which activates the relay CC. With each activation of the relay CC, a loop is completed across the lines CFR and CFT to the code output circuit which activates the external gong, display arrangement or other indicating device.

The output on line CT from the gate G53 is applied to set the units/tens flip-flop placing ground on the lead ST and a high (+5) is applied to lead EU via gates G56 and G57. The ground on lead CCT is also applied through gates G59 and G60 to the input of gate G30 to reset the start flip-flop. With the start flip-flop reset, the output of gate G30 is applied through gate G61 to reset the counter C1. At the same time, the output from gate G50 of the units/tens flip-flop will start the counter C2 by enabling gate G62 permitting the 60 PPM signal to reach the counter. The counter C2 will count until all inputs to gate G63 are high, at which time it will stop and via gates G64 and G65 the start flip-flop will be set and the counter C1 will start once again. The counter C2 in providing a high at all of the inputs of the gate G63 has run for two seconds which provides an interdigit interval.

The counter C1 will run once again with the 120 PPM signal applied thereto and the relay CC will be actuated on and off in the same manner as before; however, this time the lead ST is at ground potential and the lead EU to the gate G58 in FIG. 5 is high so that the count of the counter C1 will be anded with the binary count stored in the flip-flops FFA–FFC in the gates G57–G59. When a correspondence between the counts is detected, the gate G58 will be enabled and ground will be applied on line CU. The units/tens flip-flop will then be reset and the start flip-flop will also be reset via gates G66 and G67 connection to the input of gate G30 of the start flip-flop. At the same time, the lead EU goes to ground, the ST lead goes high with the resetting of the units/tens flip-flop and the count four flip-flop made up of gates G68 and G69 will be set via gate G70 enabling gate G71 to pass the 60 PPM signal to start the counter C2 once again. Since the counter C2 previously stopped at a count equivalent to a time period of two seconds, the counter will now pick up from the previous count and continue until it reaches a count equivalent to 6 seconds, i.e., measuring a difference of 4 seconds between counts. At this point, all of the inputs to gate G72 will be high thereby resetting the start flip-flop via gates G73, G74, G75 and G65. The cycle starts again with the tens digit since now the ST lead is high and the EU is at ground potential. The timing arrangement associated with the counter C2 provides a 4 second interval before the code is repeated and a two second inter digital period between digits. This cycle will continue until a stop code call signal STC is received from the logic circuitry in FIG. 3.

Receipt of ground on lead STC to the input of the stop flip-flop formed by gates G76 and G77 in coincidence with output from gate G72 via gate G78 at the input of gate G79 will result in a resetting of the start flip-flop, the enable transfer flip-flop, the units/tens flip-flop and the count of four flip-flop. Any output of the gate G72 will be applied via gates G80 and G81 during the course of the code call to reset the counter C2 after both digits have been sounded and also to reset the count of four flip-flop subsequent to the four second interval before the code is repeated. The gating of the stop code call signal STC with the output of gate G72 assures that the code is not interrupted before conclusion thereof but terminates at its end thus preventing wrong codes from being generated. To assure that some malfunction does not keep generating a code after the parties release, a time out counter (not shown) generates a signal T0 eight seconds after all parties have released, the signal T0 being applied to reset the enable transfer flip-flop and the start flip-flop thereby terminating code generation.

ATTENDANT ORIGINATED CODE CALL

In a private branch exchange embodying the present invention, the code call can also be originated from the attendant, for example in the case where a trunk call comes into the system for a particular subscriber who cannot be located in his office or in the area in which he may normally be found. In the exemplary system disclosed in this application consideration is given to the possibility of providing two attendant stations, either of which may establish calls in the systems, such as code calls.

An attendant may establish a code call in the same manner as a subscriber by keying the digits YXX representing the access digit and the two digits identifying the subscriber being called. The common control recognizing the establishment of the call from the attendant register will connect the attendant to the code call circuit via lines TOT and ROT and either lead AS1 or AS2 in FIG. 3 will go to ground depending upon which attendant originated the call. At the same time, the common control will start the code call sequence of code generation as described above.

If it is assumed that the first attendant originates the code call, the lead AS1 in FIG. 3 will be grounded while lead AS2 will remain high (+5). This will place a high at one input of gates G88 via gates G86 and G87 from the output of gate G85. With the attendant connected to the code call circuit, a high will appear from the common control on lead SAC to the other input of gate G88 enabling the gate and thereby rendering the leads BYR and BCH high at the outputs of gate G15 and G16, respectively. As indicated previously in connection with subscriber originated code calls, highs on the latter two leads will busy the code call circuit 160, turn on the busy lamp and provide an output on lead TRL to the traffic recording equipment, all of this signifying that the trunk is busy. At this time the code is being generated and the attendant may remain with the trunk until the called subscriber responds, or the attendant may place the trunk on hold during further processing of the code call so as to be free to perform other duties. In such event, when the called subscriber responds by dialing a designated reply digit Z at the nearest telephone, the system will in accordance with the present invention automatically recall the attendant to indicate that the called party has been obtained.

If the attendant places the trunk on hold by activation of a hold key, the lead AS1 will be high and a ground pulse will be produced on the lead HT from the attendant's register. This ground pulse will set the hold flip-flop formed by gates G90 and G91. In addition, the output from gate G91 of the hold flip-flop will be applied through gates G87 and G88 to take over the control of lines BYR and BCH at the output of gates G15 and G16. This state remains until the called party answers.

When the called party dials the digit assigned as an answering code, the common control will recognize this digit and mark the associated line circuit. The common control will also recognize that the code call circuit is on hold from the output ACC from the hold flip-flop applied through gate G94 and therefore will proceed to establish a connection between the marked line circuit of the responding party and the attendant. The common control will then instruct the trunk control circuit to place a ground on lead OPM thereby operating the M relay to extend the mark leads MK1 at ground potential through the switching matrix 110 to the responding station. The path finding operation as discussed previously then serves to connect the attendant through the code call trunk to the responding station.

With connection of the calling code circuit to the responding subscriber, the sleeve flip-flop is set from lead AB via gates G11, G12 and G13. Thus, the high from the output of gate G5 of the sleeve flip-flop will enable gate G92 permitting the 120 PPM signal to pass to gate G93 thereby pulsing the line BTL to the attendant indicating to the attendant that she is being called. In addition the set sleeve flip-flop applies ground to lead STC through gate G84 stopping code call generation. Also, the sleeve and hold flip-flops will provide the necessary inputs to gate G94 to provide ground on lead OPR operating the OP relay which extends ring back tone from the lead RBT via the OP contacts to the subscriber and signaling the attendant via the lead SIG.

When the attendant answers, the lead TKPT in FIG. 3 goes to ground potential resetting the hold flip-flop which will make leads OPR and BTL high. Thus, the relay OP will deactuate removing ring back tone from the subscriber. At this point the attendant is connected to the subscriber and they may converse.

When the subscriber releases, relay AB will release and this together with the next DST pulse will reset the sleeve flip-flop, which will remove ground from the T1 and the ARY lead dropping the switch train and thereby disconnecting the code call circuit 160.

What I claim is:

1. In an automatic telephone system including a plurality of subscriber line circuits, a plurality of junctors, a link network in the form of a plural stage switching matrix, and common control means for interconnecting subscriber line circuits through said link network and a junctor, a code call circuit comprising a transmission bridge relay circuit including a direct current source, acquisition means responsive to detection by said common control means of a code call request for connecting said transmission bridge relay circuit through said link network to the subscriber line circuit requesting the code call to establish a d.c. loop with said line circuit including said direct current source, storage means connected to said common control means for receiving and storing digits from said common control means representing a subscriber to be paged, means connected to said storage means for generating code call signals corresponding to said stored digits, which code call signals may be used to generate visible and audible signals at prescribed locations, and release means responsive to receipt in said common control means of a digit indicating response to the code call from an answering line circuit for applying to the calling subscriber line circuit a distinctive mark signal from said transmission bridge relay circuit through said link network and totally releasing the code call circuit from said link network and the calling subscriber line circuit, so that the answering subscriber line circuit from which said digit indicating response to the code call is received and said marked calling subscriber line circuit may be interconnected through said link network and a junctor by said common control means in response to said distinctive mark signal.

2. The code call circuit defined in claim 1, wherein said acquisition means includes first relay means for connecting said transmission bridge relay circuit to an outlet of said link network and sleeve flip-flop means for actuating said first relay means when set by said common control means.

3. The code call circuit defined in claim 2, wherein said release means includes means responsive to said common control means for resetting said sleeve flip-flop means, thereby de-actuating said first relay means.

4. The code call circuit defined in claim 1, wherein said means for generating code call signals includes counter means for generating periodic pulses representing an increasing binary count, means responsive to each increase in said binary count for generating a code call signal, and comparison means for stopping and resetting said counter means when said binary count corresponds to the digits stored in said means for receiving and storing digits.

5. In a PABX telephone system including a plurality of subscriber line circuits, a plurality of junctors, at least one attendant register, a link network in the form of a plural stage switching matrix, and common control means for interconnecting subscriber line circuits and connecting said attendant register to a subscriber line circuit through said link network and a junctor in response to dialed digits, a code call circuit comprising a transmission bridge relay circuit providing a voice path which may be connected only between said attendant register and a subscriber line circuit, acquisition means responsive to detection of at least one digit by said common control means representative of a code call request from a calling subscriber line circuit for connecting said transmission bridge relay circuit through said link network to said calling subscriber line circuit to establish a d.c. loop therewith, storage means connected to said common control means for storing digits generated from said calling subscriber line circuit representing the code of a subscriber to be paged, means connected to said storage means for generating code call signals corresponding to said stored digits, which code call signals may be used to generate visible and audible signals at prescribed locations, and release means responsive to receipt of a first signal from said common control means representing detection of a digit indicating response to the code call initiated by a subscriber from an answering line circuit for applying to the calling subscriber line circuit a distinctive mark signal from said transmission bridge relay circuit through said link network and totally releasing the code call circuit including said transmission bridge relay circuit from said link network and the calling subscriber line circuit, so that the answering subscriber line circuit and said marked calling subscriber line circuit may be interconnected through said link network and a junctor by said common control means in response to said distinctive mark signal.

6. The code call circuit defined in claim 5, wherein said acquisition means includes means for connecting said transmission bridge relay circuit to said attendant register in response to detection by said common control means of at least one digit representative of a code call request from said attendant register.

7. The code call circuit defined in claim 6, further comprising busy indicating means actuated by said attendant for indicating a busy condition of the code call circuit to said common control means while permitting said attendant register to release from said transmission bridge relay circuit.

The code call circuit as defined in claim 7, wherein said acquisition means further includes means responsive to a second signal from said common control means representing detection of said digit indicating response to a code call originated from said attendant register for connecting said transmission bridge relay circuit to said answering subscriber line circuit.

9. The code call circuit as defined in claim 8, further including recall means for signaling said attendant register upon connection of said answering subscriber line circuit to said transmission bridge relay circuit at the time said busy indicating means is actuated.

10. The code call circuit as defined in claim 9, wherein said busy indicating means includes busy flip-flop means providing a busy signal to said common control means when set from said attendant register.

11. The code call circuit defined in claim 10, wherein said acquisition means includes first relay means for connecting said transmission bridge relay circuit to an outlet of said link network and sleeve flip-flop means said first relay means when set by said common control means.

12. The code call circuit defined in claim 11, wherein said recall means includes means responsive to the set condition of both said sleeve flip-flop means and said busy flip-flop means for signaling said attendant register.

13. The code call circuit defined in claim 5, wherein said acquisition means includes first relay means for connecting said transmission bridge relay circuit to an outlet of said link network and sleeve flip-flop means for actuating said first relay means when set by said common control means.

14. The code call circuit defined in claim 13, wherein said release means includes means for actuating said to said common control means for resetting said sleeve flip-flop means, thereby de-actuating said first relay means.

15. The code call circuit defined in claim 5, wherein said means for generating code call signals includes counter means for generating periodic pulses representing an increasing binary count, means responsive to each increase in said binary count for generating a code call signal, and comparison means for stopping and resetting said counter means when said binary count corresponds to the digits stored in said means for receiving and storing digits.

16. In a telephone system, a plurality of line circuits, a plurality of junctors, a link network in the form of a plural stage switching matrix, common control means for connecting a calling line circuit to a called line circuit through said link network and a junctor, calling code means for controlling the transmission of code call signals, means responsive to said common control means for connecting said calling code means to a calling line circuit, storage means for registering particular code call designations in said calling code means responsive to receipt of signals from said calling line circuit, means for transmitting distinctive code call signals in accordance with said registration of said particular designations, and means responsive to detection by said common control means of an answer signal from an answering line circuit for causing said transmitting means to halt the transmission of said distinctive code call signals, the improvement essentially consisting of circuit designation means also responsive to detection by said common control means of an answer signal from an answering line circuit for applying to said calling line circuit a distinct identifying mark signal through said link network, and release means for totally releasing said calling code means from said link network and said calling line circuit upon detection of said distinctive identifying mark by said common control means, said common control means including means responsive to said distinctive identifying mark signal for connecting said calling and answering line circuits via said link network and a junctor.

17. The combination defined in claim 16, further including at least one attendant register, and said calling code means including a transmission bridge relay circuit providing a voice path which may be connected only between said attendant register and a subscriber line circuit.

18. The combination defined in claim 17, wherein said means for transmitting distinctive code call signals includes counter means for generating periodic pulses representing an increasing binary count, means responsive to each increase in said binary count for generating a code call signal, and comparison means for stopping and resetting said counter means when said binary count corresponds to the code call designations registered in said storage means.

* * * * *

UNITED STATES PATENT OFFICE

CERTIFICATE OF CORRECTION

PATENT NO. : 3,676,603

DATED : July 11, 1972

INVENTOR(S) : Ignas Budrys and Ernest O. Lee, Jr.

It is certified that error appears in the above-identified patent and that said Letters Patent are hereby corrected as shown below:

| | |
|---|---|
| Col. 4, line 72 | "BY" should read ---$\overline{BY}$--- |
| Col. 5, line 70 | "BY" should read ---$\overline{BY}$--- (both occurrences). |
| Col. 6, line 11 | Cancel "extends all the way through" and insert ---on lead S1 thus identifying the--- |
| Col. 11, line 30 | Cancel "for actuating said" and insert ---responsive---. |

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*